United States Patent [19]

Yamamoto et al.

[11] 4,042,674

[45] Aug. 16, 1977

[54] PROCESS FOR TREATING THE MOTHER LIQUOR BY COOLING IN THE PRODUCTION OF ANHYDROUS SODIUM DITHIONITE

[75] Inventors: Kousuke Yamamoto; Shinji Takenaka; Kazuo Maeda, all of Ohmuta, Japan

[73] Assignee: Mitsui Toatsu Chemicals Inc., Tokyo, Japan

[21] Appl. No.: 687,447

[22] Filed: May 18, 1976

[30] Foreign Application Priority Data

May 21, 1975 Japan ................................. 50-59570

[51] Int. Cl.$^2$ ............................................ C01B 17/66
[52] U.S. Cl. ...................................... 423/515; 23/296; 23/302 T; 260/488 F; 423/514; 423/512 A; 423/184; 423/199; 203/74
[58] Field of Search ................... 423/512 A, 515, 514, 423/551, 184, 198, 199, 202, 203; 260/488 F; 23/296, 302 T; 203/74, 14

[56] References Cited

U.S. PATENT DOCUMENTS

| 3,718,732 | 2/1973 | Winslow et al. | 423/515 X |
| 3,961,034 | 6/1976 | Bostian et al. | 423/515 X |

FOREIGN PATENT DOCUMENTS

| 47-17132 | 5/1972 | Japan | 423/515 |
| 47-16413 | 5/1972 | Japan | 423/515 |

*Primary Examiner*—Jack Cooper
*Attorney, Agent, or Firm*—Sherman & Shalloway

[57] ABSTRACT

In the production of anhydrous sodium dithionite by reacting sodium formate, an alkaline sodium compound and sulfurous acid anhydride in hydrous methanol, a process for treating the mother liquor, which comprises cooling the mother liquor left after the separation of the resulting anhydrous sodium dithionite to a temperature in the range of +5° to −30° C, and separating the precipitated sodium thiosulfate by filtration.

10 Claims, No Drawings

PROCESS FOR TREATING THE MOTHER LIQUOR BY COOLING IN THE PRODUCTION OF ANHYDROUS SODIUM DITHIONITE

This invention concerns an improvement in and relating to a process for preparing anhydrous sodium dithionite (to be referred to as hydrosulfite) by reacting sodium formate, an alkaline sodium compound and sulfurous acid anhydride in hydrous methanol, and more specifically, to a process for treating the mother liquor left after separation of hydrosulfite in the above process in order to recover the unreacted sodium formate and methanol and use them effectively in the subsequent reaction.

A number of suggestions have been made as to a process for preparing hydrosulfite by reacting sodium formate, an alkaline sodium compound and sulfurous acid anhydride in hydrous methanol. Generally, the amount of sodium formate consumed in this reaction is less than 60% of the sodium formate used, and most of the remainder is left unreacted in the mother liquor. It is desirable both economically and for the purpose of reducing COD in the waste water to recycle the mother liquor and effectively use the unreacted sodium formate and methanol present in it.

Recycling of the mother liquor, however, poses the following problems. Generally, in a reaction of forming hydrosulfite, sodium thiosulfate is generated by a side-reaction and contained in the mother liquor. The sodium thiosulfte decomposes hydrosulfite in the production of hydrosulfite, and promotes the formation of by-product sodium thiosulfate. For this reason, when the mother liquor is directly recycled, the amount of sodium thiosulfate formed increases in the reaction system of forming hydrosulfite, and the yield of the hydrosulfite decreases drastically.

Our experiments have ascertained that the allowable amount of sodium thiosulfate in the reaction system for producing hydrosulfite is not moe than 1.5% by weight (all percentages appearing hereinafter and by weight), preferably not more than 0.7%, based on the starting sodium formate in the case of a general batchwise method. When sodium thiosulfate is added to the reaction system in an amount of more than 4% based on the starting sodium formate, no hydrosulfite can be obtained. When sodium thiosulfate is added to the reaction system in an amount of 1.0%, and 0.5% based on the starting sodium formate, the yield of hydrosulfite decreases to 90 and 95%, respectively, of the yield obtained without the addition of sodium thiosulfate. In a continuous method, the allowable amount of sodium thiosulfate is smaller, and needs to be not more than 0.3% based on the starting sodium formate.

Accordingly, when the mother liquor is to be recycled, it is necessary to remove sodium thiosulfate from it prior to recycling. In an attempt to achieve it, the recycling of the mother liquor after decomposition and removal of sodium thiosulfate contained in it (Japanese patent publication No. 16413/72), and the method comprising converting the unreacted sodium formate to methyl formate, recovering the methyl formate by distillation and recycling the recovered methyl formate (West German OLS No. 2,215,116; Japanese patent publication No. 17132/72), for example, have been suggested. These methods, however, suffer from disadvantages. For example, (1) a great amount of the mother liquor should all by treated by distillation; (2) after recovery of methyl formate, the mother liquor becomes a slurry containing large quantities of solids precipitated, and is difficult to handle; and (3) sometimes, sulfur gets mixed with the methyl formate recovered, and causes a decrease in the yield of hydrosulfite.

We investigated the method of removing sodium thiosulfate from the mother liquor in order to enable the mother liquor to be recycled for further use, and found the following facts.

1. When the mother liquor is cooled to a temperature within a specified range, only sodium thiosulfate precipitates efficiently as a solid. Separation of it affords a filtrate having an extremely low content of sodium thiosulfate.

2. When an alkali is added to this filtrate to adjust its pH to at least 8, sodium thiosulfate coprecipitates together with the sulfite salts, and therefore, the concentration of sodium thiosulfate in the filtrate can be further reduced.

These discoveries led to the accomplishment of the present invention.

It is an object of this invention to provide a process for effectively removing sodium thiosulfate from the mother liquor left after the separation of hydrosulfite in the production of hydrosulfite by reacting sodium formate, an alkaline sodium compound and sulfurous acid anhydride in hydrous methanol.

The above object can be achieved by cooling the mother liquor to a temperature in the range of $+5°$ to $-30°$ C and separating the precipitated sodium thiosulfate by filtration, and if desired adding an alkali to the resulting filtrate to adjust its pH to at least 8 and separating the precipitated solid by filtration.

In this invention, the alkaline sodium compound means sodium hydroxide, sodium carbonate and sodium bicarbonate, and sodium hydroxide is preferred.

In the process of the present invention, the mother liquor is cooled to a temperature of $+5°$ to $-30°$ C, and the precipitated sodium thiosulfate is separated by filtration, in order to remove sodium thiosulfate from the mother liquor. Usually, the mother liquor left after the separation of hydrosulfite is neutral to weakly acidic, and generally consists of, by weight, 2.5 to 6% of acidic sodium sulfite, 0.4 to 5.0% of sodium thiosulfate, 2.5 to 8% of sodium formate, 64 to 78% of methanol, and 17 to 25% of water.

It is common knowledge that cooling of the mother liquor results in the precipitation of not only sodium thiosulfate, but also other substances according to their solubilities corresponding to the cooling temperatures. However, when the mother liquor is cooled to a temperature in the range of $+5°$ to $-30°$ C, sodium thiosulfate alone precipitates selectively, and acid sodium sulfate and sodium formate dissolved in the mother liquor scarcely precipitate. When it is cooled to temperatures below $-30°$ C, the acid sodium sulfate and sodium formate also precipitate. It is not advisable therefore to cool the mother liquor to below $-30°$ C. The concentration of sodium thiosulfate still dissolved in the mother liquor after separation of sodium thiosulfate by cooling differs somewhat according to the composition of the mother liquor, but the difference is only slight within a temperature range of $0°$ to $-30°$ C. Thus, when the concentration of sodium thiosulfate dissolved and the unit production costs of the raw materials and electric power are considered, the desirable cooling temperature is from $0°$ to $-10°$ C.

Stirring is not always required in cooling the mother liquor. Generally, however, cooling is performed preferably with stirring in order to increase the efficiency of the cooling operation and facilitate the precipitation of the solid sodium thiosulfate.

The time during which the mother liquor is maintained at the above-mentioned cooling temperatures in order to separate sodium thiosulfate (the cooling time) is generally 0.5 to 3 hours, preferably 1 to 1.5 hours. When the cooling time is shorter, the precipitation of sodium thiosulfate tends to be incomplete, and on the other hand, when the cooling is performed for a longer period, no special benefit can be obtained.

Cooling of the mother liquor can be carried out either by a batchwise method or by a continuous method. When it is carried out batchwise, a small amount of sodium thiosulfate can be added as a crystal nucleus to the mother liquor in order to facilitate the precipitation of sodium thiosulfate. In the continuous method, the addition of the crystal nucleus is generally unnecessary.

Cooling of the mother liquor in the above-described manner results in the selective precipitation of sodium thiosulfate as a solid. The solid is then separated by filtration. The sodium thiosulfate so separated generally has a purity of at least 98%. On the other hand, the concentration of sodium thiosulfate in the filtrate (to be referred to as the cooled mother liquor) decreases to 0.2 to 0.7%.

In the batchwise process for producing hydrosulfite, the cooled mother liquor can be directly recycled. The amount of sodium thiosulfate to be recycled corresponds to 0.4 to 1.2% of the amount of the starting sodium formate in the reaction system for producing hydrosulfite. The presence of sodium thiosulfate in such an amount does not cause a great reduction in the yield of the hydrosulfite.

In contrast, in the continuous production of hydrosulfite, the amount of sodium thiosulfate present greatly affects the yield of hydrosulfite. Hence, when the cooled mother liquor is directly recycled, it is difficult to product hydrosulfite advantageously. The continuous process for producing hydrosulfite can be advantageously operated by adding alkalies to the cooled mother liquor to raise its pH to at least 8, separating the precipitated solids by filtration, and recycling the resulting filtrate.

The alkali used in this invention includes alkali metal hydroxides and alkaline earth metal hydroxides. Of these, sodium hydroxide and potassium hydroxide are preferred. The sodium hydroxide is especially preferred. The alkali can be added either as such or as an aqueous solution. Sodium hydroxide is used preferably as an aqueous solution having a concentration of at least about 40%, especially 45 to 55%. When the amount of the alkali is small and the pH of the mother liquor does not reach 8, the precipitation of solids tends to become insufficient. On the other hand, when the alkali is added in an amount more than necessary, no special effect is obtained, and the alkali becomes waste. Furthermore, when the alkali is added as an aqueous solution, it may unfavorably result in a high water content of the cooled mother liquor. Generally, it is not necessary to raise the pH of the mother liquor beyond 12. Operationally, it is preferred that the alkali be added so as to adjust the pH of the mother liquor to 9-11.

When the pH of the cooled mother liquor is raised to at least 8, acid sodium sulfite in the mother liquor precipitates as a salt of an alkali metal or alkaline earth metal with sulfurous acid, for example, sodium sulfite, and sodium thiosulfate, by coprecipitation, also precipitates together with the sulfite salt. Since the temperature dependence of the solubility of the sulfate salt is small, the precipitation of the sulfite by addition of an alkali to the mother liquor can be performed over a broad temperature range. For the convenience of the treating procedure, however, it is preferred to perform it at a temperature of 20° to 60° C, especially 30° to 50° C. When the treatment is carried out within this temperature range, the filtrability of the precipitated solid (the sulfite salt containing sodium thiosulfate) is good, and it can be smoothly separated from the mother liquid by filtration. The treatment can be performed without stirring, but preferably with a moderate degree of stirring. Precipitation of the sulfite salt is rapid and substantially ends as soon as the alkali is added to the mother liquor to adjust its pH to at least 8.

In this way, the precipitated solid consisting of the sulfite salt and sodium thiosulfate is separated by filtration from the mother liquor. The resulting filtrate generally has a content of sodium thiosulfate decreased to 0.05% or less. This concentration is far lower than the concentration of sodium thiosulfate dissolved in the filtrate obtained by adding an alkali to the mother liquor without a cooling treatment to adjust its pH to at least 8, and separating the solid precipitated. Accordingly, the filtrate left after the separation of the solids can be directly recycled to the continuous production of hydrosulfite.

This filtrate still contains a very small amount of sodium thiosulfate dissolved therein. Oxidation of this filtrate in the following manner can afford a filtrate containing no sodium thiosulfate. When then mother liquor is oxidized with an oxidizing agent in an alkaline condition, both the sulfite salts and sodium thiosulfate present in small amounts are oxidized to sulfates. However, since the use of the filtrate containing not more than 0.05% of sodium thiosulfate hardly affects the yield of hydrosulfite, it is not altogether necessary to oxidize the filtrate.

The oxidizing agent that can be used includes hypochlorites, chlorine, ozone, and hydrogen peroxide. Ozone and hydrogen peroxide are most feasible.

When oxygen or air is used as the oxidizing agent, the sulfite salt is readily oxidized to a sulfate, but sodium thiosulfate does not undergo oxidation. Accordingly, the use of oxygen or air alone does not suit the purpose of this invention. But since it can easily oxidize the sulfite salt, it can be used conjointly with other oxidizing agents, or after oxidizing with oxygen, the product is further treated with other oxidizing agents. This can reduce the amount of the oxidizer.

Preferably, the oxidizing agent is used in an amount which is substantially equal to the total sum of the amount stoichiometrically required to oxidize the sulfite salt in the filtrate to a sulfate, and the amount stoichiometrically required to oxidize the sodium thiosulfate in the filtrate to sodium sulfate. For example, when hydrogen peroxide is used, 1 mole of it is stoichiometrically required per mole of the sulfate salt, and 4 moles of it, per mole of the sodium thiosulfate. Preferably, therefore, the hydrogen peroxide is added to the alkali-treated mother liquor in an amount substantially equal to the total sum of these stoichiometric amounts, that is, about 5 moles of the hydrogen peroxide is added to the alkali-treated mother liquor containing 1 mole each of the sulfite salt and the sodium thiosulfate. When the amount of the oxidizing agent is smaller, the unreacted sodium thiosulfate remains unfavorably. When the amount of the oxidizing agent is excessive, it causes the decomposition of hydrosulfite when recycling the mother liquor. Accordingly, in such a case, it is desirable to add a small amount of sodium sulfite to decompose the excess of the oxidizing agent. Since, however, ozone spontaneously decomposes within short periods of time, it needs to be decomposed by adding sodium sulfite.

Oxidation is carried out generally at a temperature of 20° to 60° C, preferably 40° to 50° C, and the time required is 1 to 4 hours.

The solubility of the sulfate salts formed by oxidizing the filtrate in this manner is generally 0.3 to 0.6%. Thus, at the end of the oxidation, small amounts of sulfates precipitate as solids. The solids are then separated by filtration. The residue left after the separation of the sulfates is substantially an aqueous-methanolic solution of sodium formate which does not contain sodium thiosulfate although containing traces of the sulfates. It can therefore be recycled as a raw material and solvent for the production of hydrosulfite. As the amount of the sulfate precipitated at the end of the oxidation is small, its separation can be omitted.

When the filtrate obtained after adding an alkali to the mother liquor to adjust its pH to at least 8 and separating the precipitated solids is cooled to $+5°$ to $-30°$ C, no solid is precipitated, and therefore, the concentration of sodium thiosulfate dissolved therein does not decrease. By cooling and then alkalifying the mother liquor, sodium thiosulfate in the mother liquor can be removed to an extent that it can be recycled to the continuous production of hydrosulfite for re-use.

The mother liquor from which sodium thiosulfate has been removed, that is to say, (i) the cooled mother liquor, or (ii) the filtrate obtained by adding an alkali to the cooled mother liquor to adjust its pH to at least 8, and separating the precipitated solid by filtration or further oxidizing it, can be recycled to the production of hydrosulfite in the various ways described below.

According to one method, a part, for example, about 60 to 80%, of the mother liquor deprived of sodium thiosulfate is directly recycled so as to maintain the concentration of water in the reaction system for producing hydrosulfite at a constant value, and the remainder is discarded, or sent to another recovery step for recovering methanol and sodium formate. Another method comprises adding an acid to the mother liquor deprived of sodium thiosulfate to acidify it and thereby to convert sodium formate to methyl formate. In this case, a large quantity of the liquor must be completely distilled. However, since the mother liquor deprived of sodium thiosulfate contains little or no sodium thiosulfate, there is no trouble such as the precipitation of elemental sulfur as a result of acid decomposition of sodium thiosulfate. Since the amount of a solid therein is small, it can be very easily treated. According to still another method, the liquor obtained by oxidation is entirely subjected to distillation to distill out and recover methanol, and the distillation residue is further concentrated by distillation under reduced pressure to crystallize out and recover sodium formate, and the methanol and sodium formate thus recovered are recycled to the production of anhydrous sodium dithionite. According to the process of this invention, sodium thiosulfate in the mother liquor can be efficiently removed by a very simple operation. This permits the very easy recycling of the mother liquor. The oxidation in accorcance with the method of this invention is carried out under alkaine conditions subsequent to the treatment of the mother liquor with alkalies. Hence, the amount of expensive oxidizing agents can be reduced, and there is no likelihood of the formation of sodium polythionate which impedes the formation of hydrosulfite.

When sodium formate in the mother liquor is recovered as methyl formate in the process of this invention, the liquor to be distilled no longer contains sodium thiosulfate and acidic sodium sulfite as a result of treating the mother liquor with alkalies. Hence, there is no operational trouble such as the precipitation of large amounts of the solid matter from mother liquor after the recovery of methyl formate. Furthermore, in this case, there is no likelihood of precipitation of elemental sulfur as a result of the decomposition of sodium thiosulfate with acids. The allowable amount of elemental sulfur in the reaction system for producing hydrosulfite is less than 50 ppm, and when the elemental sulfur exists in a larger amount, the decomposition of hydrosulfite is promoted, and the yield of hydrosulfite decreases drastically. In the conventional method in which the filtrate is directly acidified to convert it to methyl formate, the inclusion of elemental sulfur in the resulting methyl formate cannot be avoided. Thus, when the methyl formate is directly recycled, the yield of the hydrosulfite decreases drastically. Where the sulfur content is high, it is frequently impossible to obtain the final desired product. The process of the present invention, however, is completely free from these defects.

The following Examples illustrate the process of this invention further. Unless otherwise indicated, all percentages in these examples are by weight.

EXAMPLE 1

The mother liquor containing 1.09% of sodium thiosulfate, 3.50% of acid sodium sulfite and 7.17% of sodium formate was obtained by reacting sodium formate, sodium hydroxide and sulfurous acid anhydride in hydrous methanol, and separating the resulting hydrosulfite. The mother liquor was cooled to $-5°$ C and maintained at this temperature for 1 hour. The precipitate was separated by filtration. The filtrate contained 0.33% of sodium thiosulfate, 3.52% of acid sodium sulfite, and 7.25% of sodium formate.

EXAMPLE 2

The mother liquor containing 1.43% of sodium thiosulfate, 3.54% of acid sodium sulfite, 4.06% of sodium formate, 22.40% of water, and the remainder being methanol was cooled to $-7°$ C, and maintained at this temperature for 1 hour. The precipitated sodium thiosulfate was separated by filtration. The resulting filtrate contained 0.22% of sodium thiosulfate, 3.56% of acid sodium sulfite and 4.07% of sodium formate.

The sodium thiosulfate separated was dried at reduced pressure to afford white fine crystals having a purity of 98.80%.

EXAMPLE 3

A 50% aqueous solution of sodium hydroxide was poured at room temperature to the filtrate obtained by cooling in Example 2 to adjust its pH to 10. The precipitate was separated by filtration. The filtrate contained 0.03% of sodium thiosulfate, 0.05% of sodium sulfite, and 4.26% of sodium formate.

EXAMPLE 4

The filtrates substantially free from sodium thiosulfate obtained in Examples 1 to 3 were used in the production of hydrosulfite after replenishing them with additional sodium formate, sodium hydroxide and methanol.

In each case, the composition of the reaction mixture was so adjusted that it contained 108.0 g of sodium formate, 23.2 g of sodium hydroxide, 326.3 g of methanol and 108.8 g of water. 103.4 g of sulfurous acid anhydride was blown into the reaction system at 68° to 70° C over the course of 3 hours at a constant flow rate. Then, the reaction mixture was heated to 82° C over the course of 0.5 hour, and maintained at this temperature for 2 hours. After the beginning of heating, a gas was discharged so as to maintain the pressure at 1.5 Kg/cm$^2$·G. Then, the reaction mixture was cooled to 70° C, and the pressure of the inside of the reactor was returned to normal atmospheric pressure. The crystals of hydrosulfite was filtered in a stream of nitrogen, washed with methanol, and dried at reduced pressure. The purities and yields (based on sulfurous acid anhydride) of the resulting hydrosulfite were as shown in the following table. The results were as good as in the case of using completely new starting materials (sodium formate, sodium hydroxide, methanol and water).

| Results | Starting material New starting material | Re-use of the filtrate Filtrate obtained in Example 1 | Filtrate obtained in Example 2 | Filtrate obtained in Example 3 |
|---|---|---|---|---|
| Yield of hydrosulfite (%) | 78.5 | 81.6 | 78.4 | 78.6 |
| Purity of hydrosulfite (%) | 91.3 | 89.8 | 90.6 | 92.4 |

EXAMPLE 5

2 g of 35% aqueous hydrogen peroxide was added to 1,000 g of the filtrate containing 0.03% of sodium thiosulfate obtained in Example 3. The mixture was stirred at 50° C for 1 hour. The sodium sulfate precipitate formed as a by-product in a small amount was separated by filtration, and methanol was distilled off from the filtrate. The residue was concentrated to dryness at reduced pressure. The sodium formate recovered has a purity of 99.5%, and sodium thiosulfate was not detected.

What we claim is:

1. In the process for the production of anhydrous sodium dithionite by reacting sodium formate, an alkaline sodium compound and sulfurous acid anhydride in hydrous methanol and recycling the mother liquor left after separation of anhydrous sodium dithionite product from the reaction mixture to the production of anhydrous sodium dithionite be said reaction between sodium formate, an alkaline sodium compound, an sulfurous acid anhydride in hydrous methanol, said mother liquor containing acid sodium sulfite, sodium thiosulfate, sodium formate, methanol and water the improvement comprising:
   1. cooling the mother liquor after said separation to a temperature in the range of +5° to −30° C to precipitate sodium thiosulfate,
   2. removing the precipitated thiosulfate by filtration, and
   3. recycling the filtrate to said production of anhydrous sodium dithionite.

2. The process of claim 1 wherein in step (1) the mother liquor is cooled to a temperature in the range of 0° to −10° C.

3. The process of claim 1 which further comprises between step (2) and step (3) the steps of (4) adding an alkali selected from the group consisting of alkali metal hydroxide and alkaline earth hydroxide to the filtrate obtained in step (2) to adjust the pH of the filtrate to at least 8 to thereby coprecipitate sodium thiosulfate and sodium sulfite and (5) removing the coprecipitated solids by filtration.

4. The process of claim 3 wherein the step (4) the alkali is sodium hydroxide.

5. The process of claim 3 which further comprises adding an acid to the filtrate left after the separation of the solids by filtration in step (5) to acidify it, and to convert sodium formate to methyl formate, and recovering the methyl formate.

6. The process of claim 3 wherein the filtrate left after the separation of the solids by filtration in step (5) is entirely subjected to distillation to distill out and recover methanol, and the distillation residue is further concentrated by distillation under reduced pressure to crystallize out and recover sodium formate, and the methanol and sodium formate thus recovered are recycled to said production of anhydrous sodium dithionite.

7. The process of claim 3 which further comprises (6) oxidizing the filtrate from step (5) at a temperature of 20° to 60° C with an oxidizing agent selected from the group consisting of sodium hypochlorite, chlorine, ozone and hydrogen peroxide in an amount sufficient to oxidize sodium sulfite and sodium thiosulfate remaining dissolved in the filtrate into sodium sulfate.

8. The process of claim 7 wherein the oxidizing agent is hydrogen peroxide.

9. The process of claim 7 which further comprises adding an acid to the filtrate oxidized with the oxidizing agent in step (6) to acidify it and to convert sodium formate to methyl formate, and recovering the methyl formate.

10. The process of claim 7 wherein the filtrate oxidized with the oxidizing agent in step (6) is entirely subjected to distillation to distill out and recover methanol, and the distillation residue is further concentrated by distillation under reduced presure to crystallize out and recover sodium formate, and the methanol and sodium formate thus recovered are recycled to said production of anhydrous sodium dithionite.

* * * * *

UNITED STATES PATENT OFFICE
CERTIFICATE OF CORRECTION

Patent No. 4,042,674            Dated August 16, 1977

Inventor(s) Kousuke Yamamoto et al.

It is certified that error appears in the above-identified patent and that said Letters Patent are hereby corrected as shown below:

Claim 1, column 8, line 7, after "precipitated", insert
-- sodium --

Signed and Sealed this

Seventeenth Day of January 1978

[SEAL]

Attest:

RUTH C. MASON
Attesting Officer

LUTRELLE F. PARKER
Acting Commissioner of Patents and Trademarks